United States Patent [19]
Rance et al.

[11] Patent Number: 5,194,550
[45] Date of Patent: Mar. 16, 1993

[54] ACRYLATE-BASED ADHESIVE POLYMER

[75] Inventors: Robert W. Rance, Bühl, Fed. Rep. of Germany; Etienne R. D. A. Lazarus, Haguenau, France

[73] Assignee: The Dow Chemical Company, Midland, Mich.

[21] Appl. No.: 864,783

[22] Filed: Apr. 7, 1992

Related U.S. Application Data

[63] Continuation of Ser. No. 208,955, Jun. 17, 1988.

[51] Int. Cl.$^5$ ............................................. C08F 222/02
[52] U.S. Cl. .......................... 526/318.25; 526/318.42; 526/931; 526/318.2
[58] Field of Search ...................... 526/318.25, 318.42, 526/931; 318.2

[56] References Cited

U.S. PATENT DOCUMENTS

| | | |
|---|---|---|
| 3,165,434 | 1/1965 | Keskula et al. |
| 3,301,806 | 1/1967 | Gwziak et al. |
| 3,404,116 | 10/1968 | Pueschner |
| 3,545,972 | 12/1970 | Cruz |
| 3,875,099 | 4/1975 | Kurth |
| 4,077,926 | 3/1978 | Sanderson |
| 4,177,181 | 12/1979 | Tsurumi |
| 4,257,935 | 3/1981 | Sekeguchi et al. |
| 4,370,460 | 1/1983 | Neubert et al. ................ 526/318.25 |
| 4,419,481 | 12/1983 | Schwartz |
| 4,438,232 | 3/1984 | Lee ................................. 526/318.25 |
| 4,540,739 | 9/1985 | Midgley |
| 5,070,164 | 12/1991 | Min et al. ....................... 526/318.25 |
| 5,124,422 | 6/1992 | Rance et al. ................... 526/318.25 |

FOREIGN PATENT DOCUMENTS

| | | |
|---|---|---|
| 4779385 | 3/1986 | Australia . |
| 22967 | 1/1981 | European Pat. Off. . |
| 48950 | 4/1982 | European Pat. Off. . |
| 147067 | 7/1985 | European Pat. Off. . |
| 1521776 | 3/1968 | France . |
| 5447212 | 3/1984 | Japan . |
| 59126000 | 7/1984 | Japan . |
| 59179511 | 10/1984 | Japan . |
| 6191277 | 5/1986 | Japan . |
| 61266695 | 11/1986 | Japan . |
| 1174914 | 12/1969 | United Kingdom . |

Primary Examiner—Joseph L. Schofer
Assistant Examiner—N. Sarofim

[57] ABSTRACT

A (meth)acrylate-based adhesive polymer composition is improved by the use of itaconic acid and a hydroxyalkyl (meth)acrylate, such as hydroxyethyl acrylate, polymerized therein. From 1 to 5 weight percent itaconic acid and from 1.5 to 17 weight percent hydroxyalkyl (meth)acrylate are used to improve the combinations of tack and shear strength in these adhesive polymers. With an optional tackifier, these polymers are found especially useful in pressure sensitive adhesive applications.

18 Claims, No Drawings

ACRYLATE-BASED ADHESIVE POLYMER

This application is a continuation of copending application Ser. No. 208,955, filed Jun. 17, 1988.

BACKGROUND OF THE INVENTION

The present invention relates to improved (meth)acrylate-containing adhesive polymer compositions which are particularly suitable for use as pressure sensitive adhesives. By the use of a combination of a hydroxyalkyl (meth)acrylate and itaconic acid in polymers containing (meth)acrylate-type monomers, surprising combinations of adhesion and shear strength are obtained As used in the art, the term "pressure sensitive adhesives" designates a polymeric material which, when dried, is aggressively and permanently tacky at room temperature. A typical pressure sensitive adhesive will firmly adhere to a variety of dissimilar surfaces upon mere contact without the need of more than finger- or hand-applied pressure. The most important properties recognized by the pressure sensitive adhesive industry are the adhesion ("tack") and resistance to shear of these polymer compositions. Attempts to improve the tack properties of a pressure sensitive adhesive, such as by the addition of a tackifier, unfortunately tend to reduce the resistance to shear and promote shear failure.

Recent efforts to optimize pressure sensitive adhesive properties have focused on the use of acrylate-type latex polymers and the use of minor amounts of hydrophilic monomers therein. In EP 48950 latex polymers based on acrylate and diene monomers are modified with minor amounts of an unsaturated acid to improve their pressure sensitive adhesive properties. In Japanese Pat. No. 59-47,212 similar acrylate-diene polymers are taught which attempt to replace the major part of the acid with a hydroxyalkyl acrylate monomer. Japanese patent publication No. 61-141,775 (1986) discloses the use of specific oligomeric emulsifier compounds with pressure sensitive adhesive latex polymers based on styrene and butadiene and further containing optionally methyl methacrylate, itaconic acid and hydroxyethyl acrylate. However, there is still a need for pressure sensitive adhesive polymer compositions with better combinations of tack and shear strength.

SUMMARY OF THE INVENTION

According to the present invention there is provided an improved, acrylate-based pressure sensitive polymer. This improved pressure sensitive adhesive composition is a polymer of at least one (meth)acrylate monomer characterized by comprising polymerized therein (a) 1 to 5 weight percent itaconic acid and (b) 1.5 to 17 weight percent of at least one hydroxyalkyl (meth)acrylate, said weight percentages being based on adhesive polymer weight. These polymer compositions are found to provide excellent pressure sensitive adhesive properties including good combinations of tack and resistance to shear.

DETAILED DESCRIPTION OF THE INVENTION

The essential monomeric constituent of the claimed polymeric material is one or more of the well known (meth)acrylate type monomers. As used herein this refers to alkyl esters of acrylic or methacrylic acid wherein the alkyl group has 1 to 20 carbon atoms. These monomers are generally known for the preparation of latex polymers and are represented by the formula:

$$CH_2=C(R_1)-C(O))-O-R_2 \qquad I$$

wherein $R_1$ is —H or a methyl radical and $R_2$ is a straight or branched chain alkyl radical having from 1 to 20 carbon atoms. Preferably, $R_1$ is —H (i.e., an acrylate monomer is selected). Preferably, $R_2$ contains from 2 to 8 carbon atoms with $R_2$ more preferably being n-butyl or ethylhexyl radicals. Preferred monomers include n-butyl acrylate and ethyl hexyl acrylate. The present invention has application to polymers containing a broad range of (meth)acrylate levels, for example, from 1 to 98.5 weight percent based on adhesive polymer composition exclusive of additives, fillers, etc. Preferably the polymers contain from 10 to 98 weight percent (meth)acrylate, and more preferably from 30 to 95 to weight percent.

In addition to the (meth)acrylate monomers, the polymers according to the present invention typically contain additional amounts of the well-known monovinylidene aromatic and/or conjugated diene monomers. In general, conjugated diene monomers are known for use in latex polymers and are represented by the following formula:

$$CH_2=C(R_3)-C(R_4)=C(R_5)-R_6 \qquad II$$

wherein $R_3$, $R_4$, $R_5$ and $R_6$ are independently —H, halogen, or 1- to 20-hydrocarbon radicals. Preferably $R_3$ is a —H, chloro or methyl radical and $R_4$, $R_5$ and $R_6$ are —H (i.e., the conjugated diene is butadiene, isoprene or chloroprene). Most preferably, butadiene is used as the conjugated diene.

Monovinylidene aromatic monomers are well known in the art and commonly used in preparing latex polymers. These monomers are generally represented by the formula:

$$Ar-C(R_7)=CH_2 \qquad III$$

wherein Ar is phenyl or phenyl substituted with halogen and/or one or more hydrocarbon radical(s) having 1 to 4 carbon atoms and $R_7$ is -H or a 1- to 4-carbon alkyl group. Preferred examples of such monomers include alpha methyl styrene and one or more of the vinyl toluene isomers, with styrene being the most preferred monovinylidene aromatic monomer.

The actual amounts of the (meth)acrylate and the optional conjugated diene and monovinylidene aromatic monomers used to prepare the latex polymer will depend upon the specific application intended for the pressure sensitive adhesive material. In general, the relative amounts are chosen to achieve a relatively soft (low $T_g$) polymer with higher levels of (meth)acrylate providing increased tack and softness. The monovinylidene aromatic and diene monomers can be used to replace amounts of the (meth)acrylate monomer depending on the balance of shear and adhesive strength required If used, the monovinylidene aromatic monomer provides improved shear strength with an accompanying loss of tack. It typically constitutes from 1 to 50 weight percent, preferably from 5 to 30 weight percent, more preferably from 10 to 20 weight percent of the adhesive polymer.

If used, the conjugated diene typically constitutes from 0.5 to 97.5 weight percent, preferably from 1 to 80 weight percent and more preferably from 30 to 70 weight percent of the adhesive polymer. It has also been found to be very desirable in compositions where high (meth)-acrylate contents are needed to use amounts of a conjugated diene as a crosslinking compound in amounts up to 5 weight percent, preferably 0.5 to 4 weight percent. In general, however, the types and relative amounts of these two optional components are selected to provide the desired basic polymer properties in a (meth)acrylate-type polymer.

Once the basic adhesive polymer properties are established, the property combinations are improved according to the present invention. One of the critical monomers which is employed to prepare the polymers according to the present invention is a hydroxyalkyl (meth)acrylate.

These monomers and their use in pressure sensitive adhesive compositions are generally known in the art for use with other monomer formulations and/or at lower levels. See, for example, GB Pat. No. 1 174 914 and Japanese patent publications 61-141 775 and 59-47,212. As used herein the term hydroxyalkyl (meth-)acrylate refers to a hydroxy ester of acrylic or methacrylic acid represented by the following formula:

$$CH_2=C(R_8)-C(O)-O-R_9-OH \qquad IV$$

wherein $R_8$ is —H or methyl radical and $R_9$ is a straight or branched chain hydrocarbon radical having 1 to 10 carbon atoms. Preferably $R_9$ is a methyl, ethyl, or propyl radical. The preferred hydroxyalkyl (meth)acrylate is hydroxyethyl acrylate. The hydroxyalkyl (meth)acrylate can be beneficially used in amounts of from 1.5 to 17 weight percent based upon the total weight of the adhesive polymer. Generally 2 to 17 weight percent hydroxyalkyl (meth)acrylate is used, with amounts in the range of 3 to 15 weight percent being preferred, 4 to 10 being more preferred and 4 to 7 being most preferred.

Achieving optimized pressure sensitive adhesive properties in these (meth)acrylate-containing based polymers has been found to also hinge upon the use of itaconic acid in addition to the hydroxyalkyl (meth)acrylate. Itaconic acid is known in the art as one of the several comonomeric unsaturated acids suitable in latex polymer compositions. However, it has been found to be critical in the present compositions to select itaconic acid and use it in amounts in the range of 1 to 5 weight percent based on the adhesive polymer composition weight. Preferably, amounts in the range of greater than 1 up to 4 weight percent should be used, more preferably 1.1 to 3.5 weight percent.

While prior art generally teaches the use of unsaturated carboxylic acids in latex polymer compositions, the commonly used polymerizable acids (methacrylic acid, acrylic acid and fumaric acid) are found not to provide similar benefits, such as improved shear strength/tack combinations, in the present compositions. It is totally unexpected and surprising that in the compositions according to this invention benefits in shear strength would be obtained while maintaining a good level of tack only when using itaconic acid.

In aspects other than the composition of the monomer feed(s), the pressure sensitive adhesive polymer compositions according to the present invention are prepared using conventional emulsion polymerization techniques. For example, the polymers can be prepared in a batch reaction, continuous reaction, or a batch reaction with one or more continuously added monomer streams. While not critical, the particle size of the latex can be selected to provide optimized adhesion and shear strength properties according to the teachings of U.S. Pat. No. 4,419,481, which is incorporated by reference herein. Upon completion of the latex polymerization process, usually at a solids level of about 40 to 60 percent, the latex is desirably steam distilled to remove unreacted monomer and treated as necessary with acid or base to adjust the pH.

Insofar as the desired pressure sensitive adhesive properties are maintained, various optional ingredients can be used in these compositions. For example, monomers such as vinyl and/or vinylidene chloride can be incorporated. As well known regarding the preparation of latexes and pressure sensitive adhesives, other ingredients such as anti-foaming agents, wetting agents, thickeners, plasticizers, fillers, pigments, antioxidants and metal chelating agents may be used. Known anti-foaming agents include silicon oils and acetylene glycols. Typical plasticizers include mineral oil, liquid polybutenes, liquid polyacrylates and lanoline. Zinc oxide, titanium dioxide, aluminum hydrate, calcium carbonate, and clay are typically employed fillers. Common known wetting agents include alkylphenol ethoxylates, alkali metal dialkyl sulphosuccinates, acetylene glycols and alkali metal alkyl sulphates. Commercially available surfactants are listed in "McCutcheon's Emulsifiers and Detergents" published annually. Typical thickeners include polyacrylates, polyacrylamides, xanthan gums, modified celluloses or particulate thickeners such as silicas and clays.

Tackifiers which increase the adhesion of the compositions in general or for specific surfaces may also be added. Suitable tackifiers include polyterpene resins, gum rosin, rosin esters and other rosin derivatives, oil-soluble phenolic resins, coumaroneindene resins and petroleum hydrocarbon resins. The tackifier can either be added during or before the polymerization process or blended in afterwards. When used, amounts of at least 5 weight percent based on the weight of tackifier plus base adhesive polymer are typical, preferably at least 10 weight percent and most preferably at least 15 weight percent. Normally the levels do not exceed 70 weight percent with levels of 50 weight percent or less preferred.

The compositions of the present invention may be used as the adhesive component in pressure sensitive tapes, labels, films and foams. They adhere well to polymer surfaces such as plasticized poly(vinylchloride), Mylar brand polyester film, cellulose acetate, nylon, polyethylene and polypropylene as well as to paper, metal and painted surfaces. They are especially useful in the adhesive components of labels, tapes, decorative vinyl sheets, decals, and vinyl foams and tiles.

Known coating processes, including roller coaters, blade coaters, Meyer rods or air coaters, can be used to prepare such articles of manufacture with the pressure sensitive adhesive compositions of the present invention. The resin may be coated directly to the article which then may or may not have a conventional release paper for temporary protection. Alternatively, the adhesive may be coated onto a release paper and then transferred to the second surface which is desired to be coated by passing both the release paper and the second surface together through rolls The coated substrate is dried by normal means, usually by passing it through a heating tunnel or oven which may use circulating hot air or infrared lamps to dry the coated substrate. The drying time will be a function of a number of factors such as the heat capacity of the substrate, the type of heating, the oven temperature, air velocities (if circulating air is used) and the rate of passage of the substrate through the oven or heating tunnel. One skilled in art may readily determine suitable time/temperature relationships to determine optimum drying conditions in particular equipment for the product.

The present invention will be further illustrated by the following experiments. Unless otherwise specified, all amounts are in parts by weight and temperatures in degrees Celsius.

EXAMPLE

To prepare the sample compositions described and evaluated in the following tables, the amounts of monomers indicated in the table were fed continuously to a heated, agitated latex polymerization reactor which had been purged with nitrogen. As the initial charge, the reactor was supplied with distilled water, Versenol 120 brand chelating agent (0.02 weight parts), and a styrene polymer seed latex (0.50 weight parts based on its solids). Upon heating the initial charge to a temperature of 90° C. the aqueous and monomer feeds were started and supplied over a period of 240 minutes. The aqueous feed contained sodium persulfate initiator (0.70 weight parts), Dowfax 2A1 brand alkylated diphenyl oxide disulphonate surfactant (0.60 weight parts) and sodium hydroxide (0.20 weight parts). The monomer feed components are indicated in the tables. Versenol and Dowfax are registered trademarks of the Dow Chemical Company.

For convenience, the hydroxy alkyl (meth) acrylate (if used) was fed continuously as a separate stream. Where a polymerizable carboxylic acid was used, its location was varied according to its solubility. Itaconic acid was fed as a separate aqueous feed (for 175 minutes) acrylic and methacrylic acids were added to the main monomer feed, and fumaric acid was added to the initial reactor charge. Chain transfer agents were used as shown in the tables with carbon tetrachloride being added to the main monomer feed. Tertiary dodecyl mercaptan was usually also added to the monomer feed but was added to the initial reactor charge in Compositions 9, 10, and 11. During the polymerization reaction the temperature was maintained at 90° C. followed by a cook-down period of 60 minutes at 90° C. after all feeds have been completed.

At this time the solids level was about 50 percent by weight. The remaining minor amounts of unpolymerized monomer were devolatilized and the pH adjusted to about 6. Since there was essentially complete conversion of the monomers, the polymer composition is identical to the composition of the monomer feeds supplied. The average particle size of each latex was 0.16 micrometer as measured by light scattering.

In preparing pressure sensitive adhesives formulations the latexes were blended with Triton X-100 brand octylphenol ethoxylate wetting agent (1 weight part), Acrylon A300 brand polyacrylate thickener (0.125 weight parts) and Snowtack 42CF brand resin tackifier as indicated.

These sample adhesive resins were coated onto release paper to give a dry coating weight of about 20 grams per square meter (g/m$^2$) using a wire wound rod. The adhesive layer was then dried and transferred to a face stock paper sheet by passing between two nip rollers. Shear adhesion was measured by fixing an area 3.23 square centimeters (cm$^2$) to a steel plate and measuring the time in minutes (min) for the sample to be removed at an angle of 2 degrees by a weight of 1000 grams being attached thereto. The tack of the samples was measured by the Rolling Ball method. In this method, a section of the adhesive coated sheet 20 centimeters in length was placed on a flat surface with the adhesive side facing up. A 1.1 centimeter diameter steel ball was rolled onto the adhesive layer from an 8 centimeter long, V-shaped channel inclined at an angle of 30 degrees. The distance the ball traveled before stopping is given in centimeters and was a measure of tack, the shorter distances indicating greater tack. If the tack was insufficient the ball rolled completely off the coated sheet (>20cm).

In the following tables these abbreviations are used: hydroxyalkyl (meth)acrylate is HA(M)A, n-butyl acrylate is nBuAc, butadiene is But, styrene is Sty, itaconic acid is IA, acrylic acid is AA, methacrylic acid is MAA, fumaric acid is FA, hydroxyethyl acrylate is HEA, hydroxypropyl acrylate is HPA and hydroxyethyl methacrylate is HEMA. In addition the following abbreviations are used: chain transfer agent is CTA, carbon tetrachloride is CCl4 and t-dodecyl mercaptan is t-DDM.

As can be seen comparing Composition 3 to Compositions 1* and 2*, there is clearly a surprising benefit from the combination of IA and HEA in the adhesive polymer. Comparing 3 and 4*, it can be seen that acrylic acid does not provide such an effect to these compositions. Compositions 5*, 6, 7 and 8 illustrate similar benefits with differing HA(M)A compounds.

While several compositions in the tables exhibited adhesive failure in the shear strength test, the excellent inherent shear strength of the polymer is of major importance. The reduced adhesive strength (tack) can be somewhat rectified by the use of tackifier and may even be desirable for certain applications.

TABLE I

| Composition Number | 1* | 2* | 3 | 4* | 5* | 6 | 7 | 8 |
|---|---|---|---|---|---|---|---|---|
| Monomers: | | | | | | | | |
| nBuAc | 39 | 38 | 37 | 37 | 47.5 | 45 | 45 | 45 |
| But | 49 | 47 | 46 | 45 | 50.5 | 48 | 48 | 48 |
| Sty | 10 | 10 | 10 | 10 | — | — | — | — |
| Acid: | | | | | | | | |
| IA | 2 | — | 2 | — | 2 | 2 | 2 | 2 |
| AA | — | — | — | 3 | — | — | — | — |
| HA(M)A: | | | | | | | | |
| HEA | — | 5 | 5 | 5 | — | 5 | — | — |
| HPA | — | — | — | — | — | — | 5 | — |
| HEMA | — | — | — | — | — | — | — | 5 |

Effect of the IA/HA(M)A Combination

TABLE I-continued

Effect of the IA/HA(M)A Combination

| Composition Number | 1* | 2* | 3 | 4* | 5* | 6 | 7 | 8 |
|---|---|---|---|---|---|---|---|---|
| CTA: | | | | | | | | |
| CCl$_4$ | 3 | 3 | 3 | 3 | 3 | 3 | 3 | 3 |
| t-DDM | 1 | 1 | 1 | 1 | 1 | 1 | 1 | 1 |
| Properties | | | | | | | | |
| 0% Tackifier | | | | | | | | |
| Tack | 16 | 8.5 | 8.5 | 17 | 13 | 18 | >20 | >20 |
| Shear | 73 | 11.5 | 755 | 63 | 105 | >1000 | 1000 | 19$^a$ |
| 19% Tackifier | | | | | | | | |
| Tack | 3 | 5 | 7 | 7 | 5.5 | 9 | 7.5 | 14 |
| Shear | 16 | 4 | 104 | 42 | 13 | 249 | 65 | 11$^a$ |
| 35% TAckifier | | | | | | | | |
| Tack | 4 | 2.5 | 4 | 4.5 | 4.5 | 5 | 5 | 6 |
| Shear | 7.5 | 2.3 | 33 | 11 | 4 | 80 | 14 | 15 |

*Comparative example, not an example of the present invention
$^a$Denotes adhesive failure in shear test.

In the following Table 2, the criticality of the particular acid type is shown.

TABLE II

Effect of Acid Type

| Composition Number | 9 | 10* | 11* | 12* |
|---|---|---|---|---|
| Monomers: | | | | |
| nBuAc | 92 | 91 | 92 | 90.5 |
| But | 1 | 1 | 1 | 2.5 |
| HEA | 5 | 5 | 5 | 5 |
| Acid: | | | | |
| IA | 2 | — | — | — |
| AA | — | 3 | — | — |
| MAA | — | — | 2 | — |
| FA | — | — | — | 2 |
| CTA: | | | | |
| CCl$_4$ | 3 | 3 | 3 | 3 |
| T-DDM | 0.5 | 0.5 | 0.5 | 0.5 |
| Properties (No Tackifier) | | | | |
| Tack | 6 | 8.5 | 3 | 5 |
| Shear | 30 | 10 | 13 | 1.5 |

*Comparative Example, not an example of the present invention

TABLE III

Effect of the IA level

| Composition Number | 13* | 14* | 15 | 6 | 16 |
|---|---|---|---|---|---|
| Monomers: | | | | | |
| nBuAc | 46 | 46 | 45.5 | 45 | 43.5 |
| But | 49 | 48.5 | 48.5 | 48 | 46.5 |
| IA | 0 | 0.5 | 1 | 2 | 5 |
| HEA | 5 | 5 | 5 | 5 | 5 |
| CTA: | | | | | |
| CCl$_4$ | 3 | 3 | 3 | 3 | 3 |
| t-DDM | 1 | 1 | 1 | 1 | 1 |
| Properties | | | | | |
| 0% Tackifier | | | | | |
| Tack | 7 | 6.5 | 17 | 18 | >20 |
| Shear | 8.5 | 3 | 151 | >1000 | 0.25$^a$ |
| 19% Tackifier | | | | | |
| Tack | 6 | 6.5 | 8 | 9 | >20 |
| Shear | 2 | 4 | 20 | 249 | 0.7$^a$ |
| 35% Tackifier | | | | | |
| Tack | 3 | 2.5 | 4 | 5 | 16 |
| Shear | 1 | 1.5 | 5 | 80 | 8$^a$ |

*Comparative example, not an example of the present invention.
**Comparative example illustrative of Japanese Patent 59-47,212 and not an example of the present invention.
$^a$Denotes adhesive failure in shear test.

TABLE IV

Effect of the HEA level

| Composition Number | 5* | 17 | 18 | 6 | 19 | 20 |
|---|---|---|---|---|---|---|
| Monomer | | | | | | |
| nBuAc | 47.5 | 47 | 46.5 | 45 | 43 | 39 |
| But | 50.5 | 50 | 49.5 | 48 | 46 | 42 |
| IA | 2 | 2 | 2 | 2 | 2 | 2 |
| HEA | 0 | 1 | 2 | 5 | 9 | 17 |
| CTA: | | | | | | |
| CCl$_4$ | 3 | 3 | 3 | 3 | 3 | 3 |
| T-DDM | 1 | 1 | 1 | 1 | 1 | 1 |
| Properties | | | | | | |
| 0% Tackifier | | | | | | |
| Tack | 13 | 16 | 17 | 18 | >20 | >20 |
| Shear | 105 | >1000 | 680 | >1000 | >1000 | 8$^a$ |
| 19% Tackifier | | | | | | |
| Tack | 5.5 | 7.5 | 9 | 9 | 15 | 16 |
| Shear | 13 | 16 | 47 | 249 | 97 | 46$^a$ |
| 35% Tackifier | | | | | | |
| Tack | 4.5 | 3 | 3.5 | 5 | 7 | 6.5 |
| Shear | 4 | 6 | 23 | 80 | 30 | 54 |

*Comparative example, not an example of the present invention.
$^a$Denotes adhesive failure in shear test.

What is claimed is:

1. A pressure sensitive adhesive polymer consisting of
   A. at least one (meth)acrylate monomer represented by the formula $(CH_2=C(R_1)-C(O)-O-R_2;$ B. optionally from 1 to 80 weight percent of a conjugated diene represented by the formula $CH_2=C(R_3)-C(R_4)=C(R_5)-R_6;$ C. optionally from 1 to 50 weight percent of a monovinylidene aromatic monomer according to the formula $Ar-C-(R_7)=CH_2$ D. from 1.5 to 17 weight percent of a hydroxyalkyl (meth)acrylate is represented by the formula $CH_2=C(R_8)-C(O)-O-R_9-OH;$ and E. from 1 to 5 percent by weight of itaconic acid;

$R_1$ is —H or a methyl radical;

$R_2$ is a straight or branched chain alkyl radical having from 2 to 8 carbon atoms;

$R_3$, $R_4$, $R_5$ and $R_6$ are independently —H, halogen, or 1- or 20- carbon hydrocarbon radicals;

$R_7$ is —H or a 1- to 4-carbon hydrocarbon alkyl group;

$R_8$ is —H or methyl radical; and $R_9$ is a straight or branched chain hydrocarbon radical having 1 to 10 carbon atoms.

2. The adhesive polymer of claim 1 wherein the hydroxyalkyl (meth)acrylate is hydroxyethyl acrylate or hydroxypropyl acrylate.

3. The adhesive polymer of claim 1 which contains from 1 to 97.5 weight percent (meth)acrylate monomer based on adhesive polymer weight.

4. The adhesive polymer of claim 1 which contains from 30 to 70 weight percent of a conjugated diene monomer.

5. The adhesive polymer composition of claim 4 which contains from 5 to 30 weight percent of a monovinylidene aromatic monomer.

6. The adhesive polymer of claim 1 wherein the (meth)acrylate monomer component is n-butyl acrylate and/or 2-ethyl hexylacrylate.

7. A pressure sensitive adhesive composition comprising

I. from 30 to 95 percent by weight of a pressure sensitive adhesive polymer consisting of A. at least one (meth)acrylate monomer represented by the formula $$CH_2=C(R_1)-C(O)-O-R_2;$$

B. optionally from 1 to 80 weight percent of a conjugated diene represented by the formula $$CH_2=C(R_3)-C(R_4)=C(R_5)-R_6;$$

C. optionally from 1 to 50 weight percent of a monovinylidene aromatic monomer according to the formula $$Ar-C-(R_7)=CH_2$$

D. from 1.5 to 17 weight percent of a hydroxyalkyl (meth)acrylate is represented by the formula $$CH_2=C(R_8)-C(O)-O-R_9-OH;$$

and,

E. from 1 to 5 percent by weight of itaconic acid; and,

II. from 5 to 70 weight of a tackifier; wherein $R_1$ is —H or a methyl radical;

$R_2$ is a straight or branched chain alkyl radical having from 1 to 20 carbon atoms;

$R_3$, $R_4$, $R_5$ and $R_6$ are independently —H, halogen, or 1- or 20- carbon hydrocarbon radicals;

$R_7$ is —H or a 1- to 4-hydrocarbon alkyl group;

$R_8$ is —H or methyl radical; and $R_9$ is a straight or branched chain hydrocarbon radical having 1 to 10 carbon atoms.

8. A pressure sensitive adhesion composition according to claim 7 wherein $R_2$ is a $C_{2-8}$ hydrocarbon radical.

9. A pressure sensitive adhesive composition according to claim 8 which comprises I from 50 to 90 percent by weight of the adhesive polymer composition; and II from 10 to 50 percent by weight of a tackifier.

10. A pressure sensitive adhesive composition according to claim 9 wherein the adhesive polymer (I) contains from about 1 to about 97.5 percent by weight of a (meth)acrylate monomer.

11. A pressure sensitive adhesive composition according to claim 10 wherein the adhesive polymer contains 30 to 70 percent by weight of a conjugated diene monomer.

12. A pressure sensitive adhesive composition according to claim 11 wherein the adhesive polymer (I) contains from about 5 to about 30 percent of a monovinylidene aromatic monomer.

13. A pressure sensitive adhesive composition according to claim 10 wherein the (meth)acrylate monomer is butyl acrylate or ethyl hexyl acrylate.

14. A pressure sensitive adhesive composition according to claim 10 wherein the hydroxyalkyl (meth)acrylate is hydroxyethyl (meth)acrylate or hydroxypropyl acrylate.

15. An article coated with a pressure sensitive adhesive polymer according to claim 1.

16. An article according to claim 15 wherein the coated article is a film, tape or label.

17. An article coated with a pressure sensitive adhesive composition according to claim 7.

18. An article according to claim 17 wherein the coated article is a film tape or label.

* * * * *